United States Patent
Bonanati et al.

(10) Patent No.: US 10,560,225 B2
(45) Date of Patent: Feb. 11, 2020

(54) METHOD OF OPERATING A COMMUNICATION SYSTEM IN A TIME-DIVISION MULTIPLEXING TECHNIQUE

(71) Applicant: R3—Reliable Realtime Radio Communications GmbH, Berlin (DE)

(72) Inventors: Florian Bonanati, Berlin (DE); Mathias Bohge, Berlin (DE); James Gross, Stockholm (SE)

(73) Assignee: R-3 Reliable Realtime Radio Communication GmbH, Berlin (DE)

( * ) Notice: Subject to any disclaimer, the term of this patent is extended or adjusted under 35 U.S.C. 154(b) by 0 days.

(21) Appl. No.: 16/083,417

(22) PCT Filed: Mar. 1, 2017

(86) PCT No.: PCT/EP2017/054765
§ 371 (c)(1),
(2) Date: Sep. 7, 2018

(87) PCT Pub. No.: WO2017/157663
PCT Pub. Date: Sep. 21, 2017

(65) Prior Publication Data
US 2019/0081736 A1     Mar. 14, 2019

(30) Foreign Application Priority Data
Mar. 17, 2016    (EP) ...................... 16160878

(51) Int. Cl.
*H04L 1/14*    (2006.01)
*H04L 1/08*    (2006.01)
(Continued)

(52) U.S. Cl.
CPC .................. *H04L 1/14* (2013.01); *H04L 1/08* (2013.01); *H04L 12/433* (2013.01);
(Continued)

(58) Field of Classification Search
CPC ..................................................... H04W 72/04
See application file for complete search history.

(56) References Cited

U.S. PATENT DOCUMENTS

| 9,664,788 B2 * | 5/2017 | Schoor .................... G01S 7/354 |
| 2013/0016600 A1 | 1/2013 | Hwang et al. |

FOREIGN PATENT DOCUMENTS

| DE | 10 2012 206 529 A1 | 10/2013 |
| EP | 2 110 979 A1 | 10/2009 |

OTHER PUBLICATIONS

International Search Report and Written Opinion dated Jun. 9, 2017 issued in International Application No. PCT/EP2017/054765; filed Mar. 1, 2017.

* cited by examiner

*Primary Examiner* — Sulaiman Nooristany
(74) *Attorney, Agent, or Firm* — Gordon Rees Scully Mansukhani LLP

(57) ABSTRACT

An embodiment of the invention relates to a method of operating a communication system (10) that comprises at least four communication nodes (A, B, C, D). The communication system is operated in a time-division multiplexing technique wherein the communication is carried out in consecutive time frames which are divided into slots. At least one slot is allocated to each of the communication nodes. Each of the slots comprises, or preferably consists of, at least two consecutive sub-slots, hereinafter referred to as transmission sub-slot (TSS1-TSS4) and echo sub-slot (ESS1-ESS4). Echo signals (E (DS1)-E (DS4)) are transmitted during echo sub-slots (ESS1-ESS4).

14 Claims, 13 Drawing Sheets

| frame | F1 | | | | | | | | F2 | |
|---|---|---|---|---|---|---|---|---|---|---|
| slot | S1 | | S2 | | S3 | | S4 | | S1 | |
| sub-slot | TSS1 | ESS1 | TSS2 | ESS2 | TSS3 | ESS3 | TSS4 | ESS4 | TSS1 | ESS1 |
| transmitting nodes | A | B | B | A | C | A | D | B | A | B |
| | C | | | D | | D | | C | | C |
| transmitted signal | DS1 | E(DS1) | DS2 | E(DS2) | DS3 | E(DS3) | DS4 | E(DS4) | DS5 | E(DS5) |
| addressed node | D | D | C | C | B | B | A | A | D | D |

(51) Int. Cl.
*H04L 12/433* (2006.01)
*H04W 56/00* (2009.01)
*H04W 72/04* (2009.01)
*H04L 1/00* (2006.01)

(52) U.S. Cl.
CPC ..... *H04W 56/001* (2013.01); *H04W 72/0446* (2013.01); *H04L 2001/0093* (2013.01); *H04L 2001/0097* (2013.01)

| frame | F1 | | | | | | | | F2 | |
|---|---|---|---|---|---|---|---|---|---|---|
| slot | S1 | | S2 | | S3 | | S4 | | S1 | |
| sub-slot | TSS1 | ESS1 | TSS2 | ESS2 | TSS3 | ESS3 | TSS4 | ESS4 | TSS1 | ESS1 |
| transmitting nodes | A | C | B | A D | C | A B | D | B C | A | C D |
| transmitted signal | DS1 | E(DS1) | DS2 | E(DS2) | DS3 | E(DS3) | DS4 | E(DS4) | DS5 | E(DS5) |

Fig. 8

| frame | F1 | | | | | | | | | F2 | |
|---|---|---|---|---|---|---|---|---|---|---|---|
| slot | S1 | | S2 | | S3 | | S4 | | | S1 | |
| sub-slot | TSS1 | ESS1 | TSS2 | ESS2 | TSS3 | ESS3 | TSS4 | ESS4 | | TSS1 | ESS1 |
| transmitting nodes | A | B C | B | A D | C | A D | D | B C | | A | B C |
| transmitted signal | DS1 | E(DS1) | DS2 | E(DS2) | DS3 | E(DS3) | DS4 | E(DS4) | | DS5 | E(DS5) |
| addressed node | D | D | C | C | B | B | A | A | | D | D |

Fig. 13

METHOD OF OPERATING A COMMUNICATION SYSTEM IN A TIME-DIVISION MULTIPLEXING TECHNIQUE

The invention relates to communication systems, communication nodes and methods of operating communication systems.

BACKGROUND OF THE INVENTION

German Patent Application DE 10 2012 206 529 A1 discloses a method of operating a token-ring system where communication nodes send signals to allocated upstream communication nodes and receive signals from allocated downstream communication nodes.

OBJECTIVE OF THE PRESENT INVENTION

An objective of the present invention is to provide a method which allows operating a communication system in a very reliable way.

A further objective of the present invention is to provide a communication system and a communication node that can be operated in a very reliable way.

BRIEF SUMMARY OF THE INVENTION

An embodiment of the invention relates to a method of operating a communication system that comprises at least four communication nodes. The system is operated in a time-division multiplexing technique wherein the communication is carried out in consecutive time frames which are divided into slots. Each of the slots comprises, or preferably consists of, at least two consecutive sub-slots, namely a transmission sub-slot and an echo sub-slot. Each of the communication nodes has its own transmission sub-slot when transmitting data signals to other communication nodes, and transmits its data signals in its transmission sub-slot to the other communication nodes. Each of the communication nodes, or a predefined subset of the communication nodes, that has received a data signal (DS1-DS4) in the preceding transmission sub-slot (TSS1-TSS4), analyzes the data signal regarding a correct reception. In case of a correct reception, each of the communication nodes, or said predefined subset of the communication nodes, determines whether the received data signal is directed to itself (and as such meant to be processed by itself) or another communication node of the communication system. In the latter case, the communication node generates and transmits a corresponding echo signal in the consecutive echo sub-slot of the same slot, and otherwise processes the received data signal. The received data signal and the corresponding echo signal are identical, or differ at most in an identifier, preferably composed of a single bit or a single bit sequence, that identifies each signal as either a data signal or an echo signal.

An advantage of this embodiment of the invention is that the reliability of the communication is increased. By broadcasting the echo signals the echoing communication nodes augment the likelihood of a successful transmission of data to the dedicated recipient. For instance, if a communication node has not received a data signal in the transmission sub-slot for whatever reason (e. g. noise, interference), the communication node is given the opportunity to receive the information comprised by the missed data signal in the consecutive echo sub-slot by receiving the corresponding echo signal from another communication node that echoes or repeats the data transmission.

The slots may be allocated in an arbitrary fashion to the communication nodes, for instance by sending a management signal that pre-allocates the slots to the communication nodes.

In a preferred embodiment, each of the communication nodes, or said predefined subset of the communication nodes, decodes received data signals and analyzes a checksum that is included in each data signal, in order to determine whether a received data signal is error-free.

For instance, each of the communication nodes, or said predefined subset of the communication nodes, may analyze the checksum in order to determine whether detected errors have been eliminated, and in case of remaining bit errors, attempt to correct errors in order to obtain an error-free data signal.

Each of the echoing communication nodes may transmit the corresponding echo signal at the same frequency at which the preceding data signal has been received.

According to a preferred embodiment, the echoing communication nodes send their echo signals in a synchronized way, namely synchronized in the time and frequency domain with respect to the arrival time and the frequency of the previously received data signal that has to be echoed.

During receipt of a data signal in any of the transmission sub-slots of another communication node and before sending the corresponding echo signal in the consecutive echo sub-slot, each echoing communication node may start a timer and send the corresponding echo signal upon expiration of the timer.

During receipt of a data signal in any of the transmission sub-slots of another communication node and before sending the corresponding echo signal in the consecutive echo sub-slot, each echoing communication node may identify a synchronization bit sequence contained in the data signal and synchronize the transmission of the echo signal with respect to the synchronization bit sequence, preferably by starting a timer (or said timer mentioned above) upon receipt of the synchronization bit sequence and sending the corresponding echo signal upon expiration of the timer.

All slots in each time frame preferably have the same length, and each echo sub-slot preferably has the same length as the precedent data transmission sub-slot.

The communication system may be a token ring system where each communication node directly or indirectly—i.e. via one or more other communication nodes that function as relay nodes—sends data signals to an allocated downstream communication node and receives data signals from an allocated upstream communication node.

The end and thereby the length of each transmission sub-slot as well as the length of the consecutive echo sub-slot is preferably defined by the point in time when the respective token is sent to the allocated downstream communication.

One of the communication nodes of the communication system may be a master (or may be operated as master) and the other communication nodes may be slaves (or may be operated as slaves). Each slave preferably synchronizes its internal clock with the master's clock.

The master may send a master synchronization signal, preferably a master synchronization bit sequence, to the slaves in its transmission sub-slot. The synchronization signal may be transmitted in one or more separate synchronization time sub-slots comprised by each time frame and/or in a separate communication channel on a separate frequency.

In each of its transmission sub-slots, each of the communication nodes may transmit an information indicating from which other communication nodes data signals and/or echo signals have been received in the current or preceding time frame.

Further, in each of its transmission sub-slots, each of the communication nodes may transmit an information indicating the quality of the received signals with respect to data signals and/or echo signals that have been received from other communication nodes in the current or preceding time frame.

Summarizing, embodiments of the invention may relate to a method of operating a communication system that comprises at least four communication nodes. The system may be operated in a time-division multiplexing technique wherein the communication is carried out in consecutive time frames which are divided into slots. At least one slot is allocated to each of the communication nodes. Each of the slots comprises, or preferably consists of, at least two consecutive sub-slots, namely a transmission sub-slot and an echo sub-slot. Each of the communication nodes transmits its data signals in the transmission sub-slot of the allocated slot. Each of the communication nodes, or a predefined subset of the communication nodes, analyzes each data signal that has been received from any other communication node in the previous transmission sub-slot, regarding a correct reception. In case of a correct reception, each of the communication nodes, or said predefined subset of the communication nodes, determines whether the received data signal is directed to itself (and as such meant to be processed by itself) or another communication node of the communication system. In the latter case, the communication node generates a corresponding echo signal in the consecutive echo sub-slot, and otherwise processes the received data signal. The data signal and the echo signal are identical, or differ at most in an identifier, preferably composed of a single bit or a single bit sequence, that identifies each signal as either a data signal or an echo signal.

A further embodiment of the invention relates to a communication system comprising at least four communication nodes. Each of the communication nodes is configured to determine—upon receipt of a data signal from another communication node—whether the received data signal is directed to itself or another communication node of the communication system and—in the latter case—to generate an echo signal that corresponds to the received data signal.

The communication node is preferably configured to determine—upon receipt of a data signal from another communication node—whether the received data signal is directed to itself or another communication node of the communication system and —in the latter case—to generate an echo signal that corresponds to the received data signal.

The communication node may comprise a processor and a memory that stores an echo software module. The echo software module—after activation—programs the processor to determine—upon receipt of a data signal from another communication node—whether the received data signal is directed to itself or another communication node of the communication system and—in the latter case—to generate an echo signal that corresponds to the received data signal.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are therefore not to be considered to be limiting of its scope, the invention will be described and explained with additional specificity and detail by the use of the accompanying drawings in which

FIG. 8 illustrates the transmission sub-slots and echo sub-slots that are allocated to the communication nodes of the communication system according to FIG. 1;

FIG. 13 illustrates the transmission sub-slots and echo sub-slots that are allocated to the communication nodes of the communication system according to FIG. 10.

DETAILED DESCRIPTION OF THE PREFERRED EMBODIMENTS

The preferred embodiments of the present invention will be best understood by reference to the drawings. It will be readily understood that the present invention, as generally described and illustrated in the figures herein, could vary in a wide range. Thus, the following more detailed description of the exemplary embodiments of the present invention, as represented in the figures, is not intended to limit the scope of the invention, as claimed, but is merely representative of presently preferred embodiments of the invention.

Figure 1:
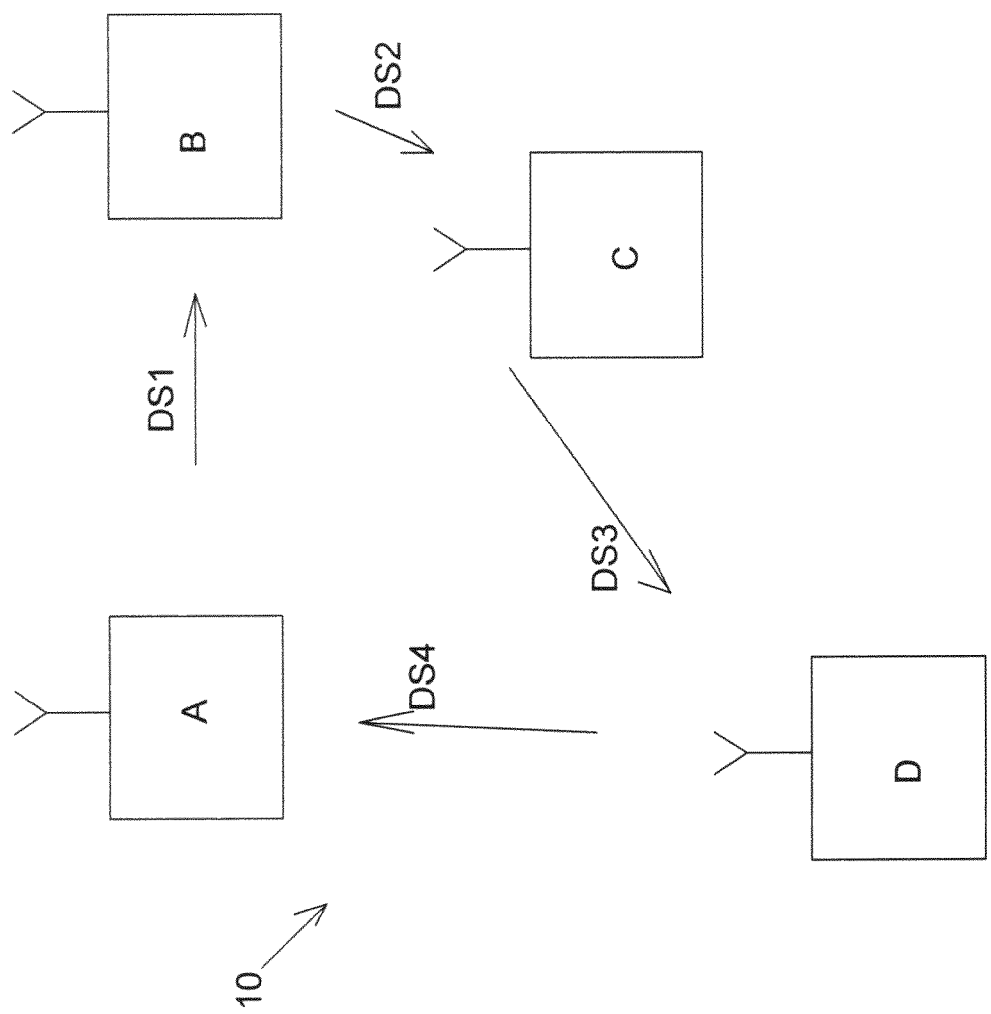
FIG. 1 shows an exemplary embodiment of a communication system that comprises four broadcast-type communication nodes.

FIG. 1 shows an exemplary embodiment of a communication system 10 according to the present invention. The communication system 10 comprises a plurality of broadcast-type communication nodes A, B, C, and D.

The communication system 10 may form a token-ring wherein each communication node directly or indirectly—i.e. via one or more other communication nodes—sends data signals DS1-DS4 to an allocated downstream communication node and receives data signals DS1-DS4 from an allocated upstream communication node. The data signals DS1-DS4 are illustrated by arrows in FIG. 1. The arrows' directions indicate the direction of the communication and thus define for each communication node which of the other communication nodes is the respective upstream node and the respective downstream node.

The communication system 10 is operated in a time-division multiplexing technique wherein the communication is carried out in consecutive time frames (see frames F1 and F2 in FIG. 8) which are divided into slots (see slots S1-S4 in FIG. 8).

Each of the communication nodes A, B, C, and D transmits its data signals DS1-DS4 in the transmission sub-slot TSS1-TSS4 of an allocated slot (S1-S4) as illustrated in FIG. 8. FIG. 8 shows that the transmission sub-slot TSS1 is allocated to communication node A, the transmission sub-slot TSS2 is allocated to communication node B, the transmission sub-slot TSS3 is allocated to communication node C, and the transmission sub-slot TSS4 is allocated to communication node D.

In order to increase the reliability of the communication system 10, the communication nodes A, B, C, and D are configured to generate echo signals. The echo signals carry the same information as the echoed data signals and therefore increase the system's redundancy. The echo signals are transmitted in echo sub-slots ESS1-ESS4 (see FIG. 8). This will be explained in an exemplary fashion with reference to FIGS. 2-7.

Figure 2:
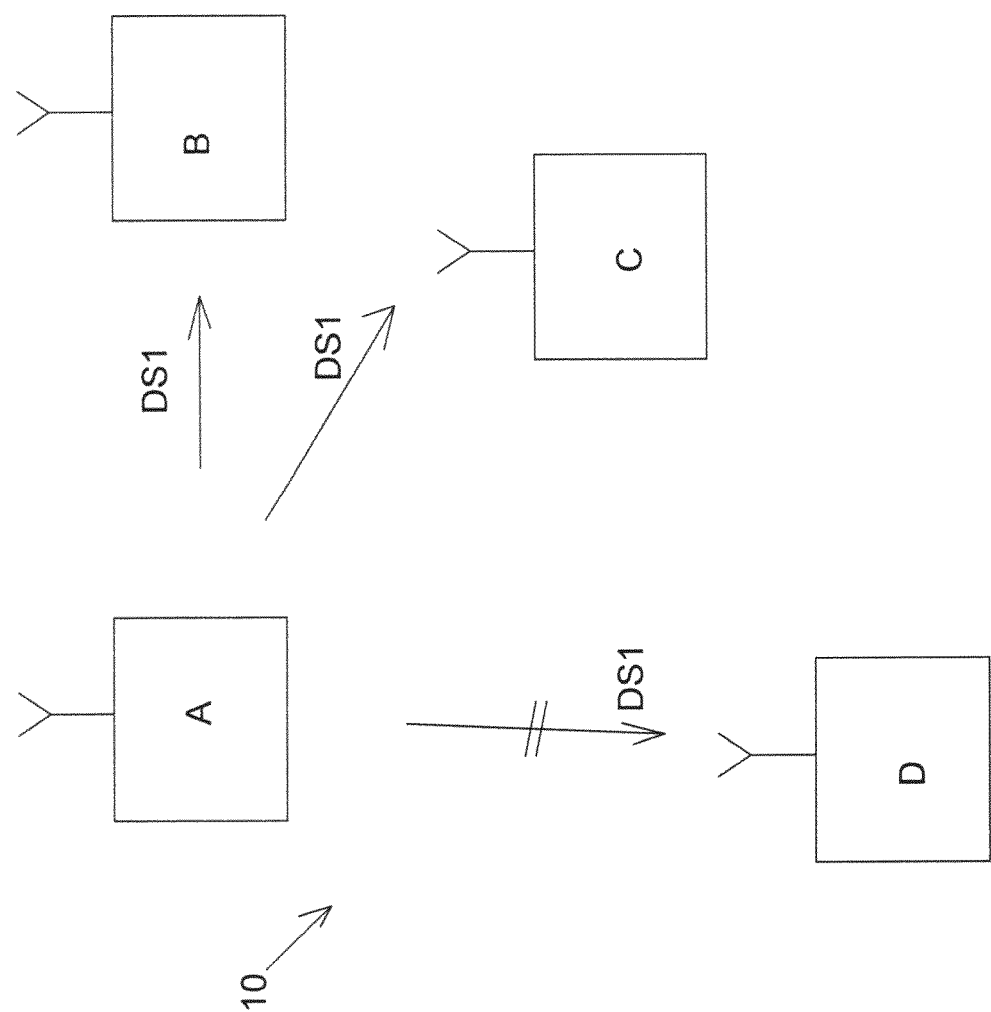
FIG. 2-7 show the communication system of FIG. 1 in different time slots during operation in a time-division multiplexing technique.

FIG. 2 illustrates the communication system 10 during the transmission sub-slot TSS1 of frame F1 in FIG. 8. The communication node A sends a data signal DS1 to the allocated communication node B. It is assumed here in an exemplary manner that the communication node C has also received the data signal DS1 whereas the communication node D has failed to receive the data signal DS1.

The communication node C has no knowledge as to whether the communication node B has successfully received the data signal DS1. Therefore, the communication node C generates and broadcasts an echo signal E(DS1) in the consecutive echo sub-slot ESS1 of slot S1 (see FIGS. 3 and 8). The echo signal E(DS1) and the respective data signal DS1 may be identical, or preferably differ at most in an identifier. Such an identifier may be composed of a single bit or a single bit sequence, that identifies each signal as either a data signal or an echo signal.

By broadcasting the echo signal E(DS1) the communication node C augments the likelihood of a successful transmission of the data contained in data signal DS1 to its dedicated recipient, here communication node B. For instance, if communication node B has not received the data signal DS1 from the communication node A in the transmission sub-slot TSS1 (see FIG. 5) for whatever reason (e.g. noise, interference), the communication node B is given the opportunity to receive the information comprised by data signal DS1 in the consecutive echo sub-slot ESS1 by receiving the echo signal E(DS1) from communication node C.

Figure 3:
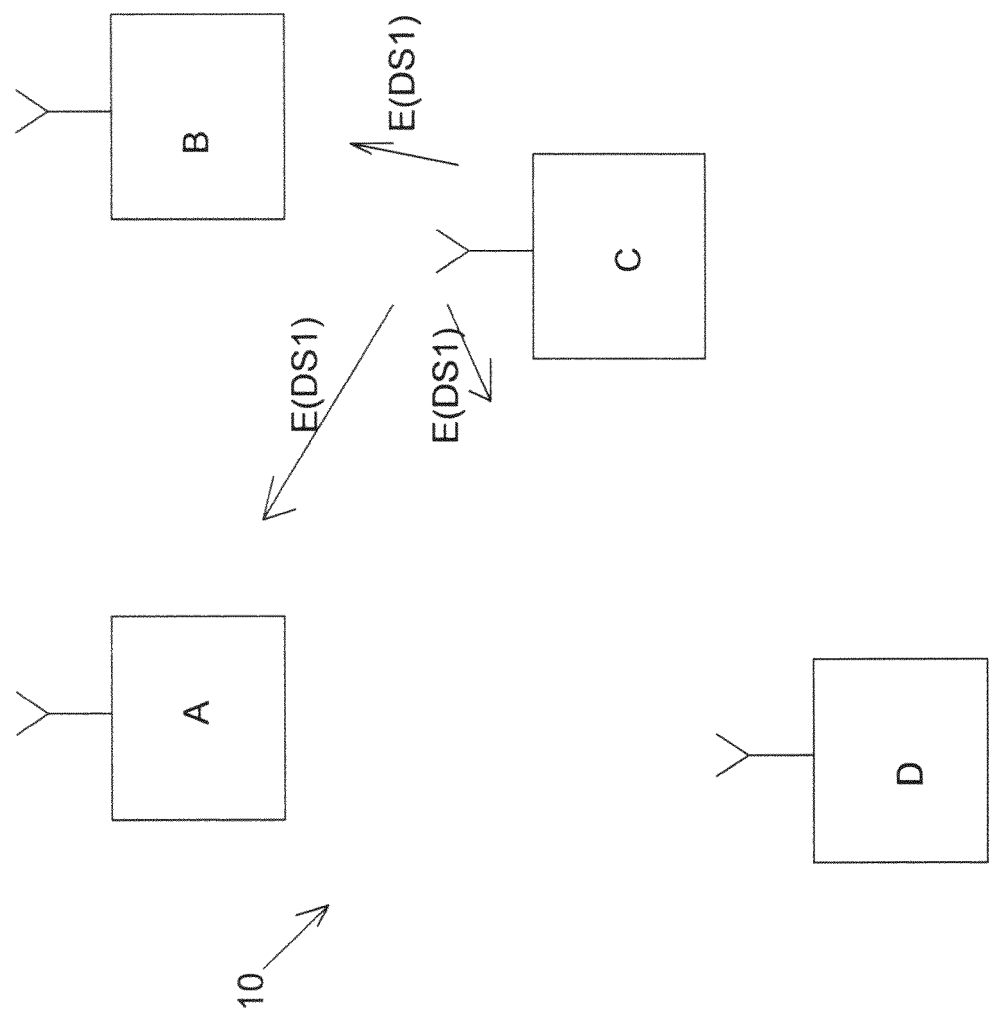

In FIG. 3, the communication node D cannot generate an echo signal because it has not received the data signal DS1 in the preceding transmission sub-slot TSS1 (see FIG. 2).

If B successfully receives the data signal DS1 from communication node A, B processes the information contained therein. The generation of an echo signal by the communication node B is not necessary for obvious reasons.

Figure 4:
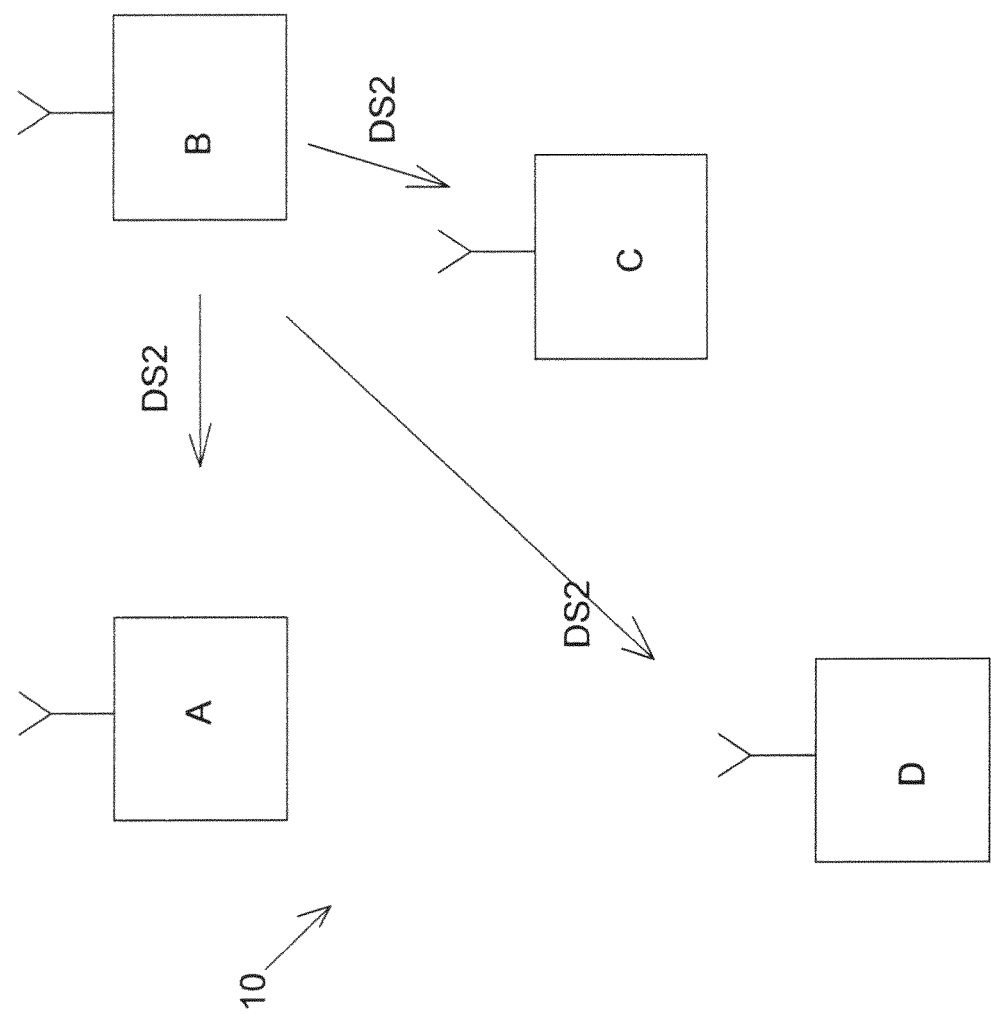
Figure 5:
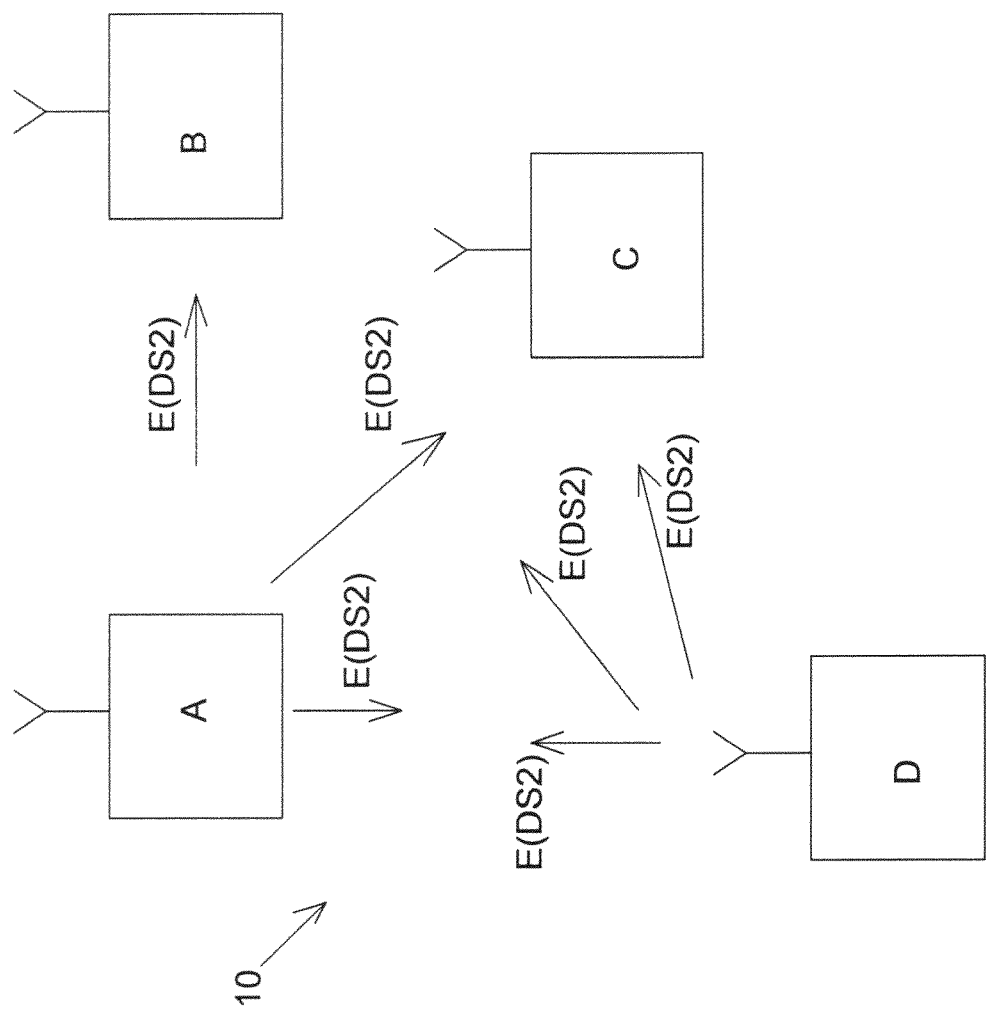

In the consecutive transmission sub-slot TSS2, the communication node B broadcasts a data signal DS2 to the allocated downstream communication node C as illustrated in FIG. 4. It is assumed here that all other communication nodes successfully receive the data signal DS2.

The communication node C determines that the received data signal DS2 is meant to be processed by communication node C (in other words by "itself") and proceeds accordingly without generating an echo signal.

The communication nodes A and D have no knowledge as to whether the communication node C has successfully received the data signal DS2. Therefore, the communication nodes A and D generate and broadcast an echo signal E(DS2) in the consecutive echo sub-slot ESS2 (see FIGS. 5 and 8). The echo signal E(DS2) and the respective data signal DS2 may be identical, or preferably differ at most in the identifier mentioned above.

Figure 6:
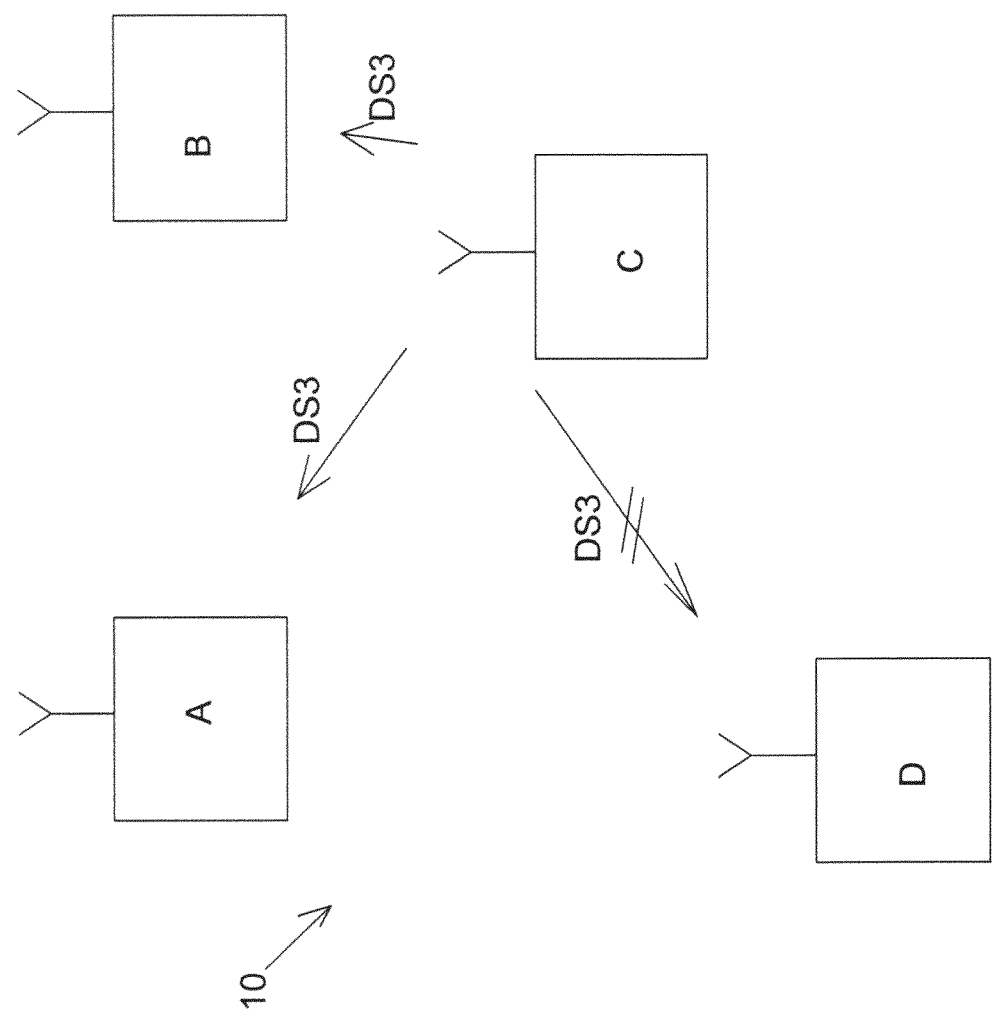
Figure 7:
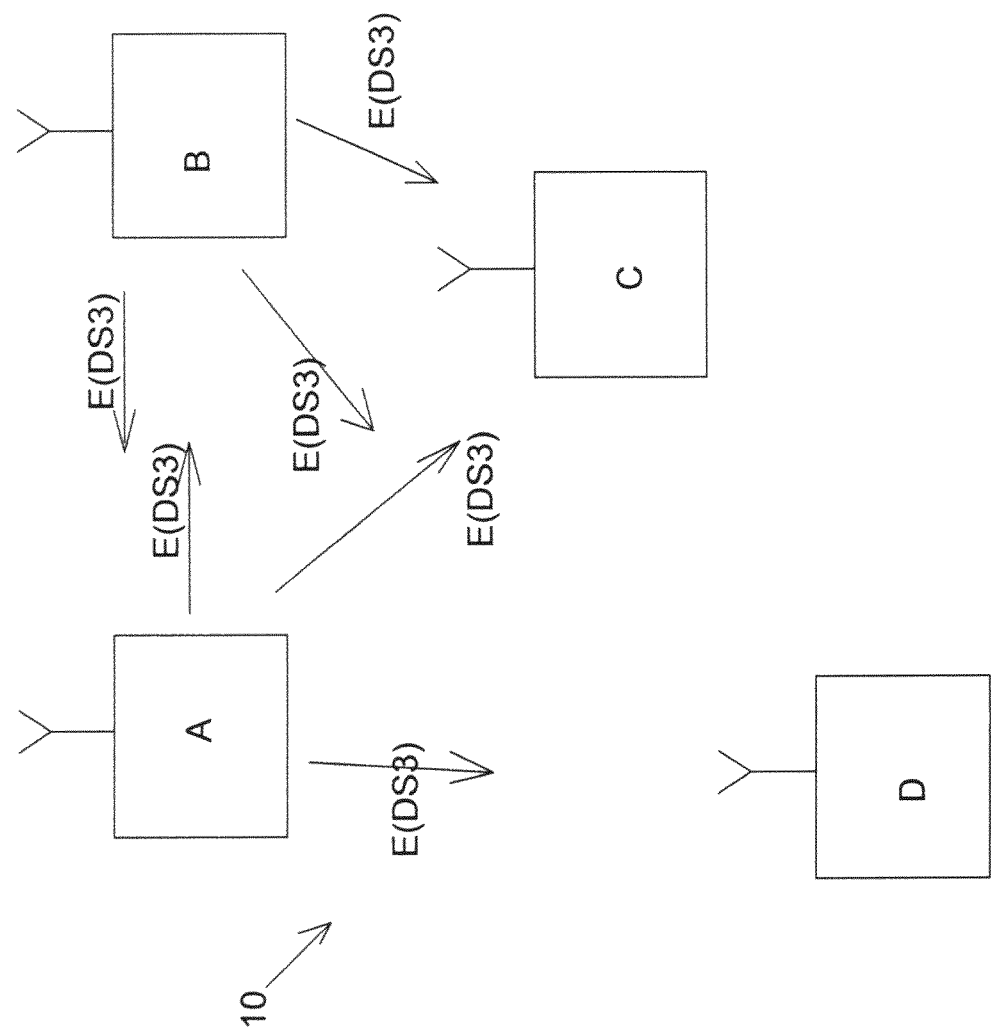

In the consecutive transmission sub-slot TSS3, the communication node C broadcasts a data signal DS3 to the allocated downstream communication node D as illustrated in FIGS. 6 and 8. It is assumed here that the communication nodes A and B receive the data signal DS3 whereas the transmission to communication node D fails.

The communication nodes A and B have no knowledge as to whether the communication node D has successfully received the data signal DS3. Therefore, the communication nodes A and B generate and broadcast an echo signal E(DS3) in the consecutive echo sub-slot ESS3 (see FIGS. 7 and 8). The repetition of the data transmission with respect to the data of data signal DS3 provides another chance for communication node D to receive the respective data.

The echo signal E(DS3) and the respective data signal DS3 may be identical, or preferably differ at most in the identifier mentioned above.

The further transmission of data and echo signals can proceed according to the principles laid out above.

Figure 9:
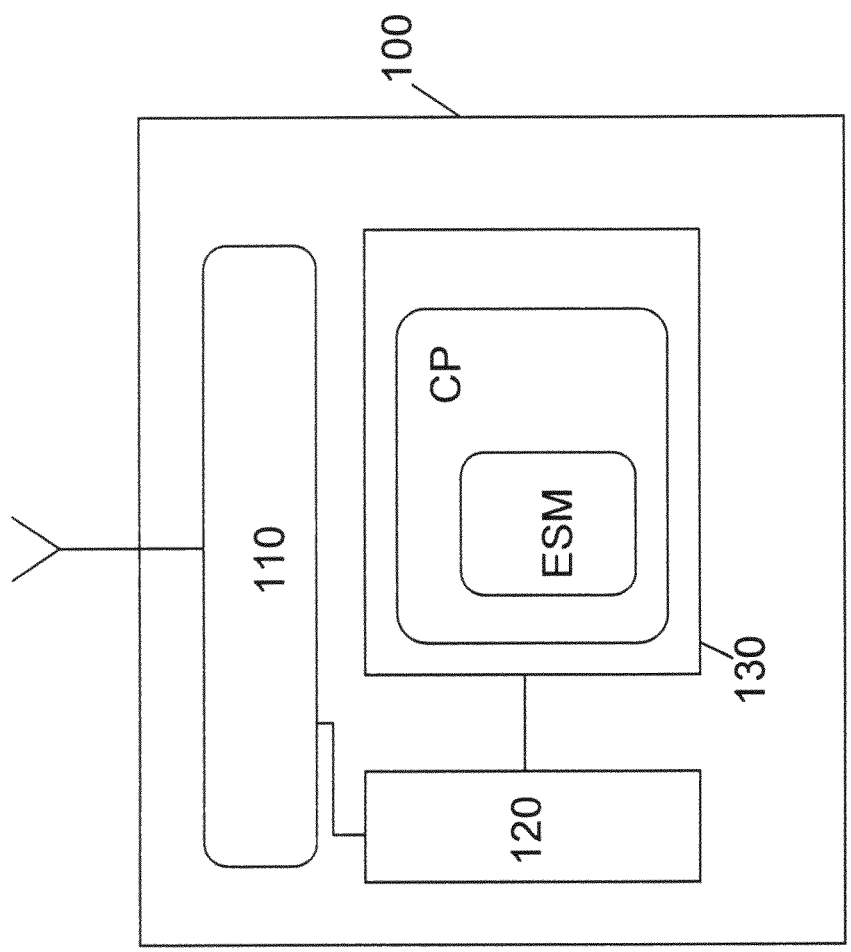
FIG. 9 illustrates an exemplary embodiment of a communication node that can be operated in the communication system according to FIG. 1.

FIG. 9 shows an exemplary embodiment of a communication node 100 that can form any of the communication nodes A, B, C, D in the communication system 10 of FIGS. 1-8.

The communication node 100 comprises a transceiver 110 capable of transmitting and receiving electromagnetic radiation, a processor unit 120 and a memory 130. The memory 130 stores a control program CP that allows the processor unit 120 to operate as explained above.

The control program CP comprises an echo software module ESM which—after activation—programs the processor to determine—upon receipt of a data signal from another communication node—whether the received data signal is directed to its communication node or another communication node of the communication system and—in the latter case—to generate an echo signal that corresponds to the received data signal.

Figure 10:
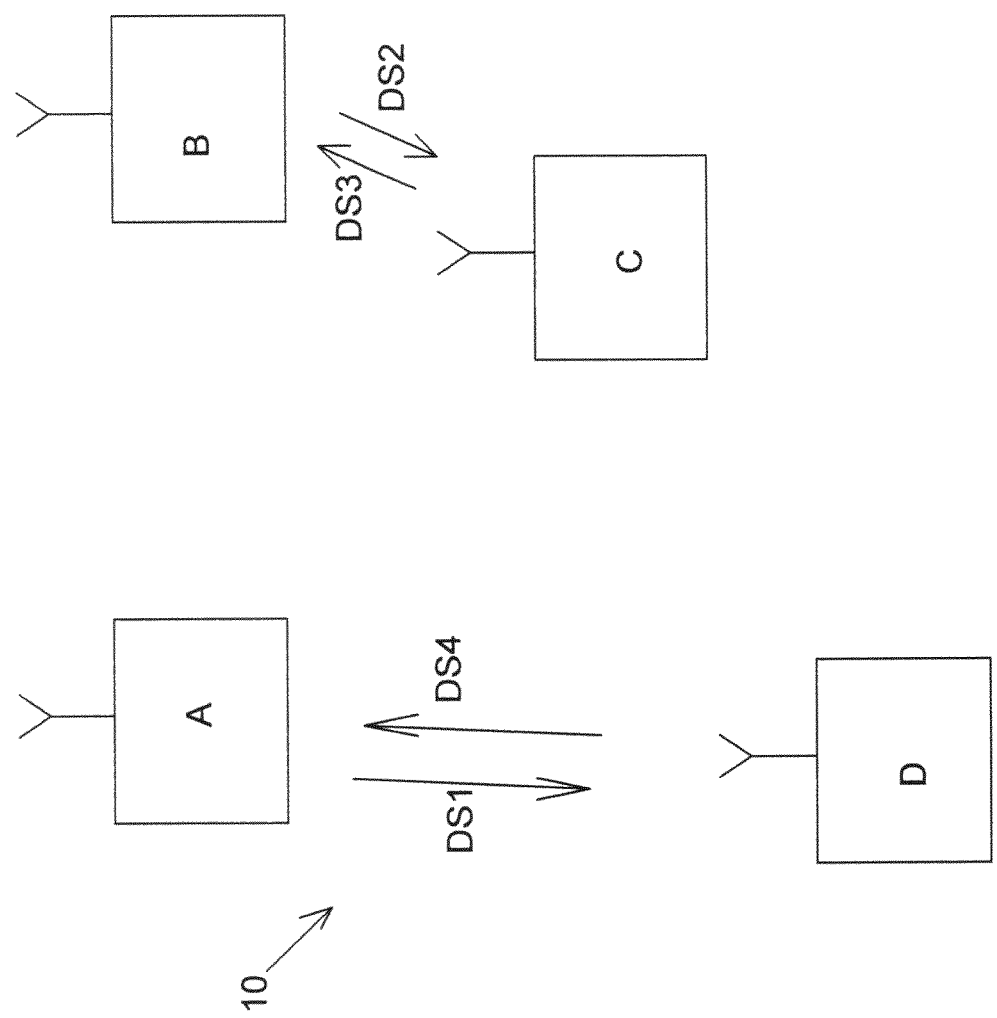
FIG. 10 shows another exemplary embodiment of a communication system that comprises four broadcast-type communication nodes.

FIG. 10 shows another exemplary embodiment of a communication system 10 according to the present invention. The communication system 10 comprises a plurality of broadcast-type communication nodes A, B, C, and D.

The communication system 10 may form a time division multiple access (TDMA) system wherein each communication node directly or indirectly—i.e. via one or more other communication nodes—sends data signals DS1-DS4 to an addressed node and receives data signals DS1-DS4 from an arbitrary communication node of the system. The data signals DS1-DS4 are illustrated by arrows in FIG. 10. The arrows' directions indicate the direction of the communication and thus define for each communication node which of the other communication nodes is the respective upstream node and the respective downstream node.

The communication system 10 is operated in a time-division multiplexing technique wherein the communication is carried out in consecutive time frames (see frames F1 and F2 in FIG. 13) which are divided into slots (see slots S1-S4 in FIG. 13).

Each of the communication nodes A, B, C, and D transmits its data signals DS1-DS4 in the transmission sub-slot TSS1-TSS4 of an allocated slot (S1-S4) as illustrated in FIG. 13. FIG. 13 shows that the transmission sub-slot TSS1 is allocated to communication node A, the transmission sub-slot TSS2 is allocated to communication node B, the transmission sub-slot TSS3 is allocated to communication node C, and the transmission sub-slot TSS4 is allocated to communication node D.

In order to increase the reliability of the communication system 10, the communication nodes A, B, C, and D are configured to generate echo signals. The echo signals carry the same information as the echoed data signals and therefore increase the system's redundancy. The echo signals are transmitted in echo sub-slots ESS1-ESS4 (see FIG. 13). This will be explained in an exemplary fashion with reference to FIGS. 11-12.

Figure 11:
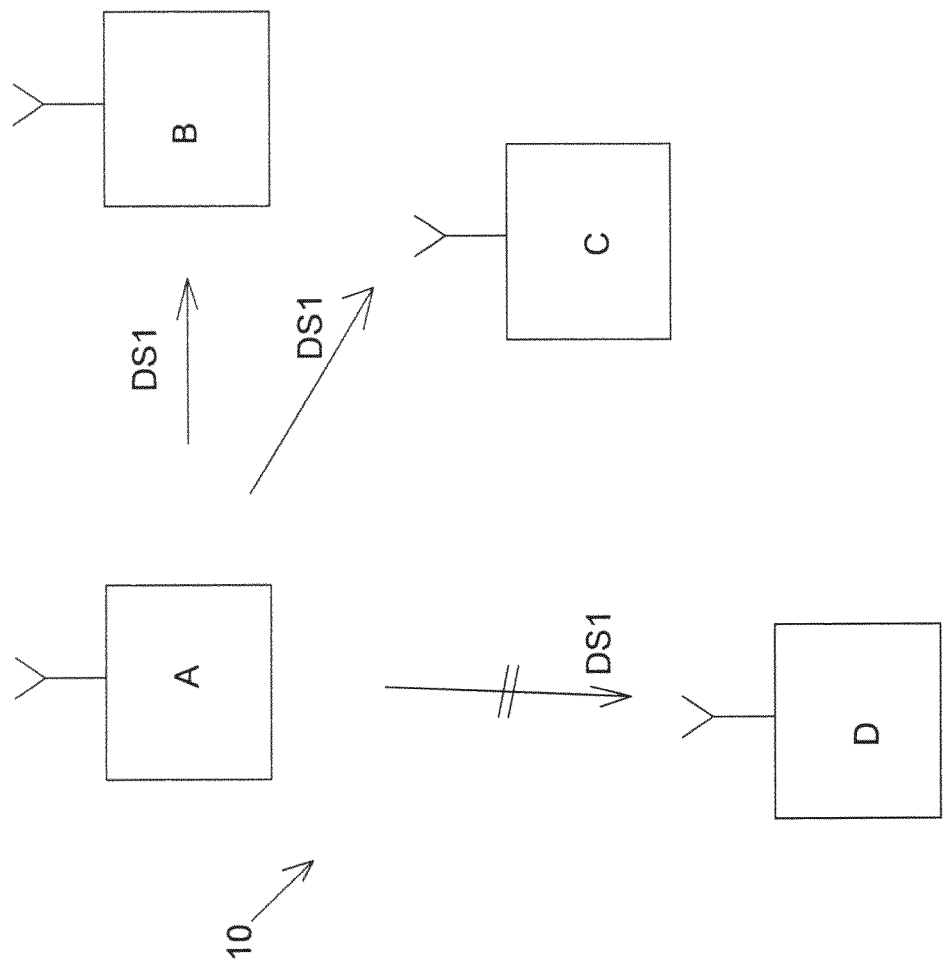
FIG. 11-12 show the communication system of FIG. 10 in different time slots during operation in a time-division multiplexing technique.
Figure 12:
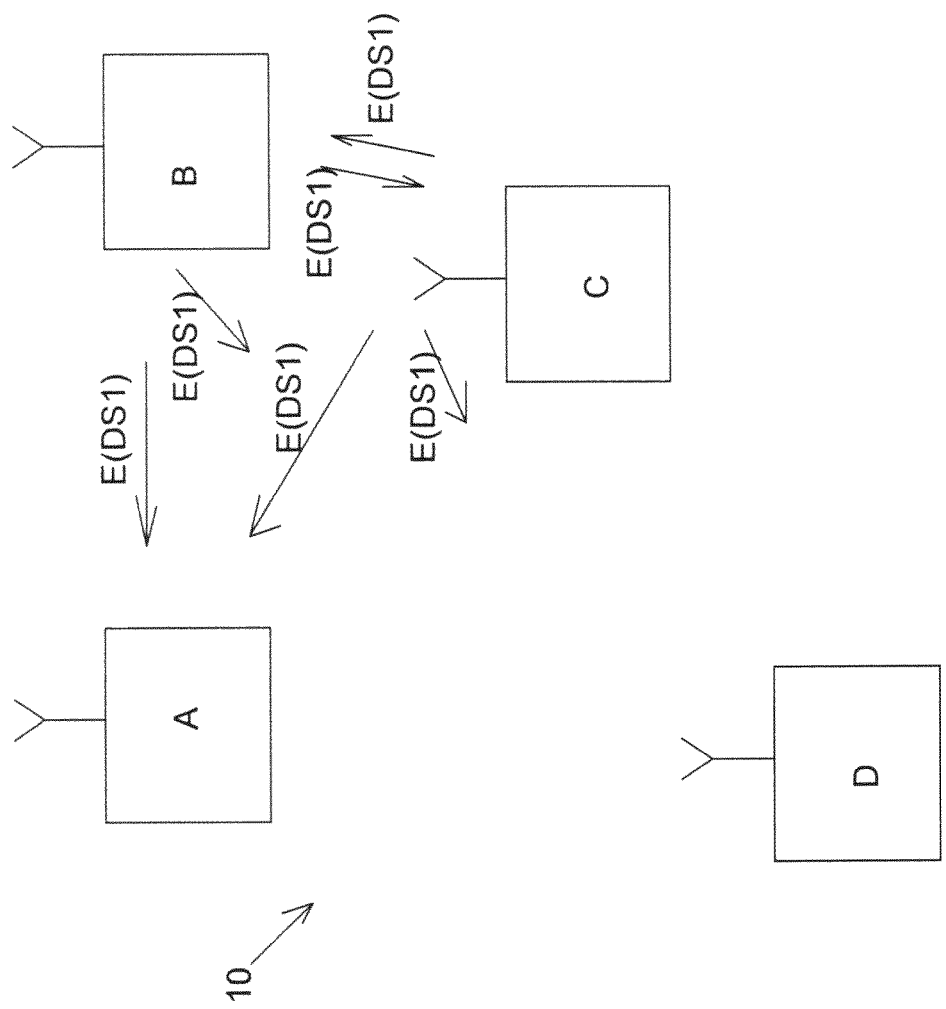

FIG. 11 illustrates the communication system 10 during the transmission sub-slot TSS1 of frame F1 in FIG. 13. The communication node A sends a data signal DS1 to the addressed communication node D. It is assumed here in an exemplary manner that the communication nodes B and C have received the data signal DS1 whereas the communication node D has failed to receive the data signal DS1.

The communication nodes B and C have no knowledge as to whether the communication node D has successfully received the data signal DS1. Therefore, the communication nodes B and C generate and broadcast an echo signal E(DS1) in the consecutive echo sub-slot ESS1 of slot S1 (see FIGS. 12 and 13). The echo signal E(DS1) and the respective data signal DS1 may be identical, or preferably differ at most in an identifier. Such an identifier may be composed of a single bit or a single bit sequence, that identifies each signal as either a data signal or an echo signal.

The invention claimed is:

1. Method of operating a communication system that comprises at least four communication nodes (A, B, C, D) wherein:
   the communication system is operated in a time-division multiplexing technique wherein the communication is carried out in time frames (F1, F2) which are divided into slots (S1-S4),
   each of the slots (S1-S4) comprises at least two sub-slots, hereinafter referred to as transmission sub-slot (TSS1-TSS4) and echo sub-slot (ESS1-ESS4),
   each of the communication nodes (A, B, C, D) has its own transmission sub-slot when transmitting data signals (DS1-DS4) to other communication nodes, and transmits its data signals (DS1-DS4) in its transmission sub-slot (TSS1-TSS4) to other communication nodes,
   each of the communication nodes (A, B, C, D), or a predefined subset of the communication nodes (A, B, C, D), that has received a data signal (DS1-DS4) in one of the transmission sub-slots (TSS1-TSS4), analyzes the data signal (DS1-DS4) regarding a correct reception, and
   in case of a correct reception, each of the communication nodes (A, B, C, D), or said predefined subset of the communication nodes (A, B, C, D), determines whether the received data signal (DS1-DS4) is directed to itself or another communication node (A, B, C, D) of the communication system and—when the received data signal (DS1-DS4) is directed to another communication node (A, B, C, D)—generates and transmits a corresponding echo signal (E(DS1)-E(DS4)) in the echo sub-slot (ESS1-ESS4) that is assigned to the same slot, and otherwise processes the received data signal (DS1-DS4),
   wherein the received data signal (DS1-DS4) and the corresponding echo signal (E(DS1)-E(DS4)) are identical, or differ at most in an identifier, preferably composed of a single bit or a single bit sequence, that identifies each signal as either a data signal (DS1-DS4) or an echo signal (E(DS1)-E(DS4)).

2. Method according to claim 1, wherein the slots are allocated in an arbitrary fashion to the communication nodes (A, B, C, D) by sending a management signal that pre-allocates the slots (S1-S4) to the communication nodes (A, B, C, D).

3. Method according to claim 1, wherein each of the communication nodes (A, B, C, D), or said predefined subset of the communication nodes (A, B, C, D), decodes received data signals (DS1-DS4) and analyzes a checksum that is included in each data signal (DS1-DS4), in order to determine whether a received data signal (DS1-DS4) is error-free.

4. Method according to claim 1, wherein the echoing communication nodes (A, B, C, D) send their echo signals (E(DS1)-E(DS4)) in a synchronized way, namely synchronized in the time and frequency domain with respect to the arrival time and the frequency of the previously received data signal (DS1-DS4) that has to be echoed.

5. Method according to claim 1, wherein during receipt of a data signal (DS1-DS4) in any of the transmission sub-slots (TSS1-TSS4) of another communication node (A, B, C, D) and before sending the corresponding echo signal (E(DS1)-E(DS4)) in the echo sub-slot (ESS1-ESS4), each echoing communication node (A, B, C, D) starts a timer and sends the corresponding echo signal (E(DS1)-E(DS4)) upon expiration of the timer.

6. Method according to claim 1, wherein during receipt of a data signal (DS1-DS4) in any of the transmission sub-slots (TSS1-TSS4) of another communication node (A, B, C, D) and before sending the corresponding echo signal (E(DS1)-E(DS4)) in the echo sub-slot (ESS1-ESS4), each echoing communication node (A, B, C, D) identifies a synchronization bit sequence contained in the data signal (DS1-DS4) and synchronizes the transmission of the echo signal (E(DS1)-E(DS4)) with respect to the synchronization bit sequence, preferably by starting a timer upon receipt of the synchronization bit sequence and sending the corresponding echo signal (E(DS1)-E(DS4)) upon expiration of the timer.

7. Method according to claim 1, wherein each of the echoing communication nodes (A, B, C, D) transmits the corresponding echo signal (E(DS1)-E(DS4)) at the same frequency at which the preceding data signal (DS1-DS4) has been received.

8. Method according to claim 1, wherein
   all slots in each time frame have the same length, and
   each echo sub-slot (ESS1-ESS4) has the same length as the precedent data transmission sub-slot.

9. Method according to claim 1, wherein
   the communication system is a token ring system where each communication node (A, B, C, D) directly or indirectly—i.e. via one or more other communication nodes (A, B, C, D) that function as relay nodes (A, B, C, D)—sends data signals (DS1-DS4) to an allocated downstream communication node (A, B, C, D) and receives data signals (DS1-DS4) from an allocated upstream communication node (A, B, C, D), and
   the end and thereby the length of each transmission sub-slot (TSS1-TSS4) as well as the length of the echo sub-slot (ESS1-ESS4) is defined by the point in time when the respective token is sent to the allocated downstream communication.

10. Method according to claim 1, wherein
    one of the communication nodes (A, B, C, D) of the communication system (10) is a master and the other communication nodes (A, B, C, D) are slaves, and
    each slave synchronizes its internal clock with the master's clock.

11. Method according to claim 10, wherein
    the master sends a master synchronization signal, preferably a master synchronization bit sequence, to the slaves in its transmission sub-slot (TSS1-TSS4), in one or more separate synchronization time sub-slots comprised by each time frame and/or in a separate communication channel on a separate frequency.

12. Method according to claim 1, wherein
in each of its transmission sub-slots (TSS1-TSS4), each of the communication nodes (A, B, C, D) transmits an information indicating from which other communication nodes (A, B, C, D) data signals (DS1-DS4) and/or echo signals (E(DS1)-E(DS4)) have been received in the current or preceding time frame and/or
in each of its transmission sub-slots (TSS1-TSS4), each of the communication nodes (A, B, C, D) transmits an information indicating the quality of the received signals with respect to data signals (DS1-DS4) and/or echo signals (E(DS1)-E(DS4)) that have been received from other communication nodes (A, B, C, D) in the current or preceding time frame.

13. Method according to claim 1, wherein
each of the slots (S1-S4) consists of two consecutive sub-slots, hereinafter referred to as transmission sub-slot (TSS1-TSS4) and echo sub-slot (ESS1-ESS4).

14. A communication system operated in a time-division multiplexing technique wherein the communication is carried out in time frames (F1, F2) which are divided into slots (S1-S4, the communication system comprising:
at least four communication nodes (A, B, C, D) and wherein each of the communication nodes includes
a transceiver (110),
a processor (120) and
a memory (130) that stores an echo software module (ESM) which—after activation—programs the processor to determine—upon receipt of a data signal (DS1-DS4) from another communication node (A, B, C, D, 100)—whether the received data signal (DS1-DS4) is directed to itself or another communication node (A, B, C, D, 100) of the communication system (10) and—in the latter case—to generate an echo signal (E(DS1)-E(DS4)) that corresponds to the received data signal
wherein each of the slots (S1-S4) comprises at least two sub-slots, hereinafter referred to as transmission sub-slot (TSS1-TSS4) and echo sub-slot (ESS1-ESS4),
wherein each of the communication nodes (A, B, C, D) has its own transmission sub-slot when transmitting data signals (DS1-DS4) to other communication nodes, and transmits its data signals (DS1-DS4) in its transmission sub-slot (TSS1-TSS4) to other communication nodes,
wherein each of the communication nodes (A, B, C, D), or a predefined subset of the communication nodes (A, B, C, D), that has received a data signal (DS1-DS4) in one of the transmission sub-slots (TSS1-TSS4), analyzes the data signal (DS1-DS4) regarding a correct reception, and
wherein in case of a correct reception, each of the communication nodes (A, B, C, D), or said predefined subset of the communication nodes (A, B, C, D), determines whether the received data signal (DS1-DS4) is directed to itself or another communication node (A, B, C, D) of the communication system (10) and—when the received data signal (DS1-DS4) is directed to another communication node (A, B, C, D)—generates and transmits a corresponding echo signal (E(DS1)-E(DS4)) in the echo sub-slot (ESS1-ESS4) that is assigned to the same slot, and otherwise processes the received data signal (DS1-DS4),
wherein the received data signal (DS1-DS4) and the corresponding echo signal (E(DS1)-E(DS4)) are identical, or differ at most in an identifier that identifies each signal as either a data signal (DS1-DS4) or an echo signal (E(DS1)-E(DS4)).

* * * * *